US006188938B1

United States Patent
Silka et al.

(10) Patent No.: US 6,188,938 B1
(45) Date of Patent: Feb. 13, 2001

(54) CLOSED LOOP CUSTOMER VIBRATION SCREENING AND RESOLUTION PROCESS

(75) Inventors: Gerard Paul Silka, Dearborn; Kenneth Alan Ward, Ann Arbor, both of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/526,383

(22) Filed: Mar. 16, 2000

(51) Int. Cl.[7] .................................................. G01M 17/00
(52) U.S. Cl. .......................... 701/29; 701/34; 73/117.3; 702/108
(58) Field of Search ................................. 701/29, 30, 34, 701/35, 116; 73/117.3; 702/188, 102

(56) References Cited

U.S. PATENT DOCUMENTS

| | | | |
|---|---|---|---|
| 3,695,098 | 10/1972 | Kirkland, Jr. ...................... | 73/117.1 |
| 3,748,896 | 7/1973 | Barrows ................................ | 73/71.5 |
| 3,844,175 | 10/1974 | Hixson .................................. | 73/557 |
| 4,381,548 | * 4/1983 | Grossman et al. ..................... | 701/29 |
| 5,313,407 | 5/1994 | Tiernan et al. ....................... | 364/508 |
| 5,434,783 | 7/1995 | Pal et al. .......................... | 364/425.05 |
| 5,535,131 | 7/1996 | Sanders ................................ | 364/487 |
| 5,551,298 | 9/1996 | Rayment ................................ | 73/669 |
| 5,641,904 | 6/1997 | Kopp et al. ............................ | 73/457 |
| 5,758,311 | 5/1998 | Tsuji et al. .......................... | 701/111 |
| 5,809,437 | * 9/1998 | Breed ..................................... | 701/29 |
| 5,950,144 | * 9/1999 | Hall et al. ............................ | 702/108 |

* cited by examiner

*Primary Examiner*—William A. Cuchlinski, Jr.
*Assistant Examiner*—Yonel Beaulieu
(74) *Attorney, Agent, or Firm*—Jerome R. Drouillard

(57) ABSTRACT

A method of incorporating customer feedback into correcting vehicle vibration begins by interviewing a vehicle owner concerning an objectionable vehicle vibration. The dealer then connects a vibration analyzer to the vehicle with the objectionable vibration through an OBD-II connector. This allows the vibration analyzer to monitor engine rpm, engine type, vehicle speed, vehicle type, and tire size. The dealer then drives the vehicle at a full range of speeds in a controlled sequence with the vehicle owner to reproduce the objectionable vehicle vibration. While the vehicle is driven, the vibration analyzer detects any vehicle vibration generated. The vibration analyzer then compares the vehicle vibration in conjunction with engine rpm, engine type, vehicle speed, vehicle type, and tire size when the vehicle owner identifies the objectionable vibration. The vibration analyzer then determines a probably cause for the vehicle vibration and generates a cause report. The dealer uses the cause report to correct the objectionable vehicle vibration. After repairing the vehicle, the dealer verifies that the vehicle vibration is gone with the vehicle owner. The cause report is then sent to a NVH engineer where it is analyzed to provide feedback to the vibration analyzer and design engineers.

18 Claims, 2 Drawing Sheets

CLOSED LOOP CUSTOMER VIBRATION SCREENING AND RESOLUTION PROCESS

TECHNICAL FIELD

The present invention relates generally to automotive repair methods and, more particularly, to a method to incorporate customer feedback into correcting vehicle vibration.

BACKGROUND ART

In order to remain successful, any industry that produces consumer goods must constantly monitor the quality of their products. If the actual or perceived quality of a product is lower than customer expectations, then the customer will find alternative producers of a similar, better quality product. Therefore, it is in the best interest of producers of consumer goods to constantly strive to improve the quality of their products.

Unfortunately, the way in which each consumer perceives quality may vary. Producing a product that fulfills a function without needing repair is only the first step in satisfying today's modern consumer. While designers are successful at making products whose subjective characteristics are perceived by consumers as high quality, it is more difficult to design a product whose objective characteristics are perceived in the same way. For example, the size, weight, or functions of a product are all easily measured and designed into a product; however, the vibrations produced, or color of a product are more subjective. Also, what may seem acceptable to a designer often may not be acceptable to a consumer.

One of these subjective characteristics is vibration in an automobile. Vehicle vibration is a major source of customer complaints. Unfortunately, prior art solutions have generally relied on subjective measurements with limited success.

Recent developments in the area of vibration detection have allowed more objective measurements of vehicle vibration. The drawback of these techniques is that they are labor intensive and do not have immediate feedback to repair personnel. These limitations make current vibration detection technologies non-conducive to an assembly plant environment. Also, even after having objective measurements of vehicle vibration, there is almost no data on what forms and types of vibration are most objectionable to the consumer.

The disadvantages associated with conventional vehicle vibration repair techniques have made it apparent that a new technique for incorporating customer feedback during a repair process into correcting vehicle vibration is needed. The new technique should be able to objectively detect vehicle vibration without significant labor involvement. The new technique should also provide immediate feedback to repair personnel to allow vehicle vibration to be corrected.

SUMMARY OF THE INVENTION

It is an object of the invention to provide an improved and reliable means for incorporating customer feedback during a repair process into correcting vehicle vibration. Another object of the invention is to reduce the labor required to objectively detect vehicle vibration.

In accordance with the objects of this invention, an improved method of incorporating customer feedback into correcting vehicle vibration is provided. In one aspect of the invention, a method of incorporating customer feedback into correcting vehicle vibration begins by interviewing a vehicle owner concerning an objectionable vehicle vibration. The dealer then connects a vibration analyzer to the vehicle in question through an OBD-II connector. This allows the vibration analyzer to monitor engine rpm, engine type, vehicle speed, vehicle type, and tire size. The dealer then drives the vehicle at a full range of speeds in a controlled sequence with the vehicle owner to reproduce the objectionable vehicle vibration. While the vehicle is driven, the vibration analyzer detects any vehicle vibration generated. The vibration analyzer then compares the vehicle vibration in conjunction with engine rpm, engine type, vehicle speed, vehicle type, and tire size when the vehicle owner identifies the objectionable vibration. The vibration analyzer then determines a probably cause for the vehicle vibration and generates a cause report. The dealer uses the cause report to correct the objectionable vehicle vibration. After repairing the vehicle, the dealer verifies with the vehicle owner that the vehicle vibration concern has been satisfied. The cause report is then sent to a NVH engineer where it is analyzed to provide information feedback to the vibration analyzer and design engineers.

The present invention achieves an improved and reliable means for incorporating customer feedback into correcting vehicle vibration. Also, the present invention is advantageous in that it provides immediate feedback to repair personnel so that the vehicle vibration may be corrected.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
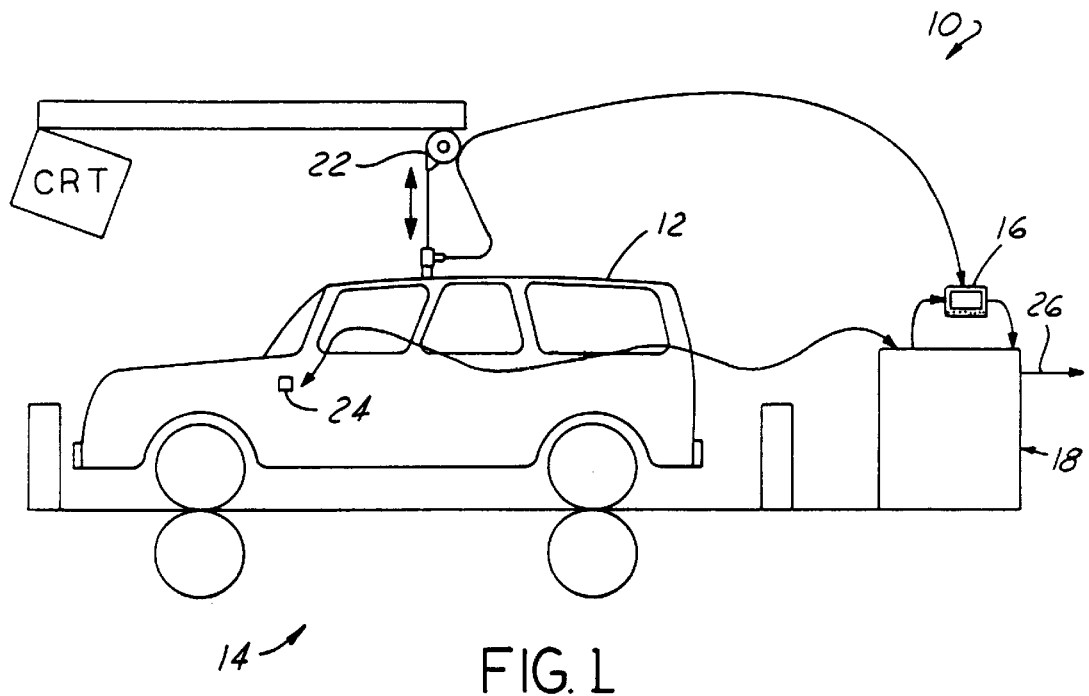
FIG. 1 is a depiction of a system for detecting and correcting vehicle vibration during an assembly process according to one embodiment of the present invention.

Referring to FIG. 1, a system for detecting and correcting vehicle vibration during an assembly process 10 according to one embodiment of the present invention is illustrated. System 10 includes a vehicle 12 located in a roll test station 14. A vibration analyzer 16 is coupled to a roll test computer system 18 and an accelerometer 20.

Accelerometer 20 is coupled to vehicle 12 during operation and is decoupled when not in use. Accelerometer 20 may include a magnetic base or other form of attachment to prevent relative movement between accelerometer 20 and vehicle 12. In the present invention accelerometer 20 is automatically raised and lowered using an air balancer 22, however, one skilled in the art would recognize that various alternative means for coupling and decoupling accelerometer 20 to vehicle 12 exist.

Roll test computer system 18 is connected to the electrical system of vehicle 12 through an OBD-II connector 24 and has access to various vehicle parameters through connector 24 and a connection to a plant broadcast system. These parameters include, but are not limited to, engine type, tire size, engine rpm, vehicle speed, vehicle type (4×2 or 4×4), gear ratios, and tire size. Roll test computer 18 is also connected to a network 26. Network 26 may be a local area network or may include a connection to an Intranet or the Internet.

Vibration analyzer 16 has access to these various vehicle parameters through roll test computer 18. While the present invention is shown using a separate vibration analyzer 16 and roll test computer system 18, one skilled in that art would recognize that they may be integrated into one unit. Vibration analyzer 16 has the capability to do logical concern diagnosis based upon inputs of vehicle parameters, engine rpm, and accelerometer 20. Vibration analyzer 16 reads a vibration signal from accelerometer 20 and does a fast Fourier analysis to determine the various input frequencies and their magnitudes. Vibration analyzer 16 uses engine rpm and gear ratios between rotating components to determine the rotating speed of each of those components. The frequencies from accelerometer 20 are then matched to each rotating component as ½, $1^{st}$, $2^{nd}$, $3^{rd}$, or $4^{th}$ order multiples of the rotating component speed. Based upon the component each vibration is associated with and the order of the frequency multiple, root causes can then be logically determined. Priority of repair sequence can be assigned by the magnitude of each vibration.

Figure 2:
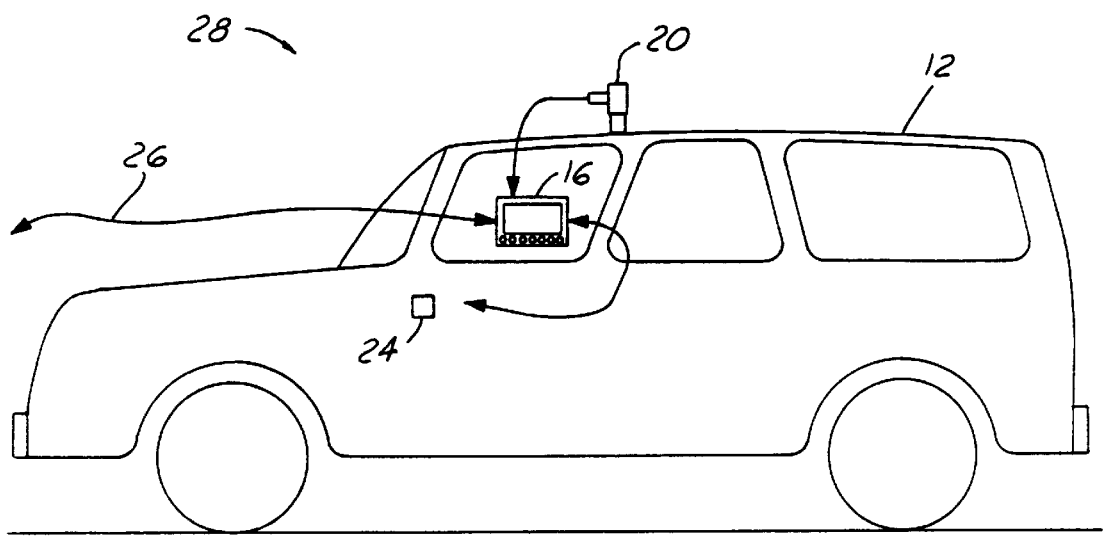
FIG. 2 is a depiction of a system for detecting and correcting vehicle vibration during a repair process according to one embodiment of the present invention.

Referring to FIG. 2, a depiction of a system for detecting and correcting vehicle vibration during a repair process 28 according to one embodiment of the present invention is illustrated. System 28 includes a vehicle 12 coupled to a vibration analyzer 16 through an OBD-II connector 24. Vibration analyzer 16 has the capability to do logical concern diagnosis based upon inputs of vehicle parameters, engine rpm, and accelerometer 20.

Vibration analyzer 16 is connected to a network 26. Network 26 may be a local area network or may include a connection to an Intranet or the Internet. Accelerometer 20 is coupled to vehicle 12 during operation and is decoupled when not in use. Accelerometer 20 may include a magnetic base or other form of attachment to prevent relative movement between accelerometer 20 and vehicle 12.

Figure 3:
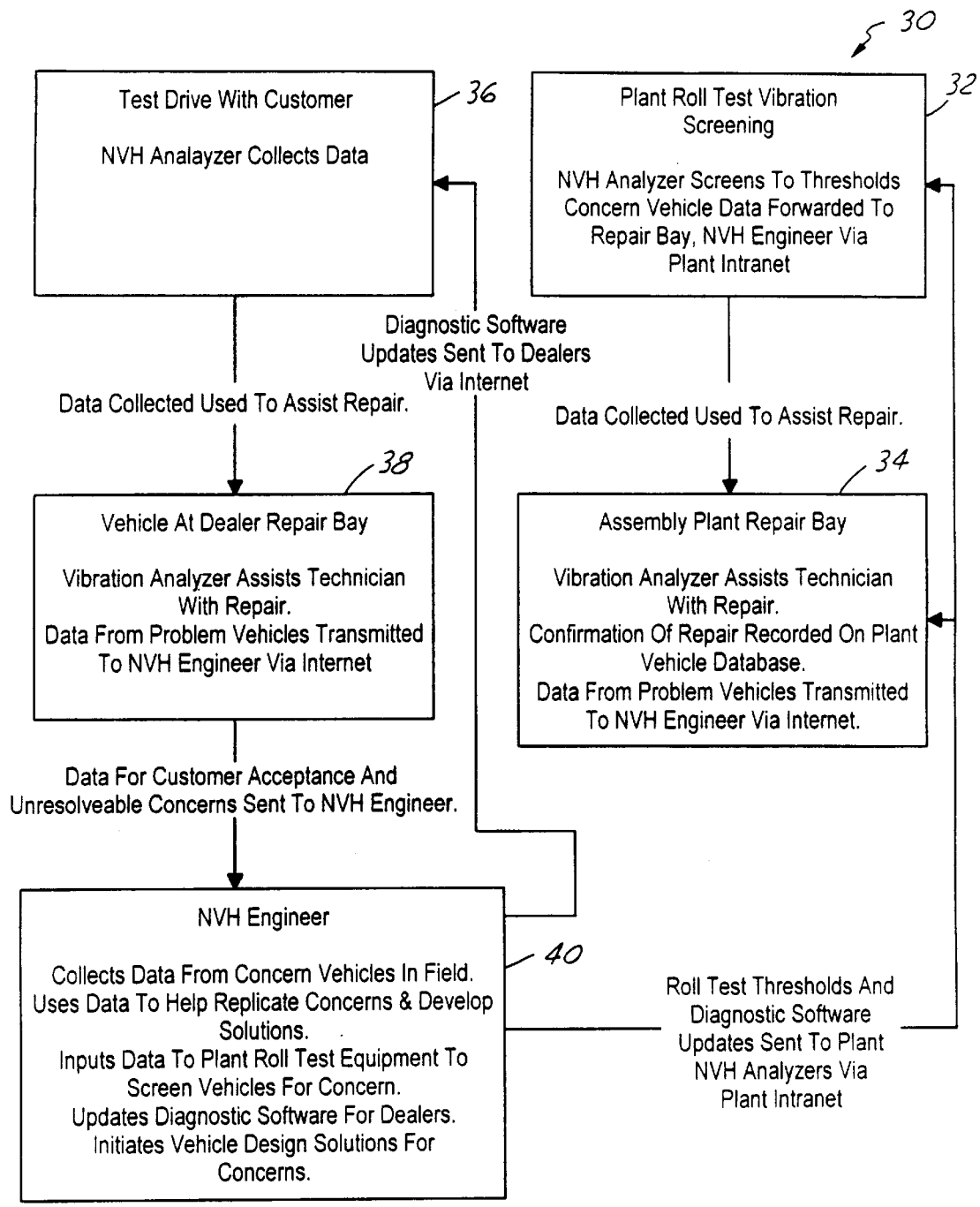
FIG. 3 is a block diagram of a method for detecting and correcting vehicle vibration during an assembly process and customer repair process according to one embodiment of the present invention.

Referring to FIG. 3, a block diagram of a method 30 for detecting and correcting vehicle vibration during an assembly process and customer repair process according to one embodiment of the present invention is illustrated. In operation, the sequence begins with step 32. At the start of the roll test cycle, vehicle 12 is driven into roll test station 14. An operator hooks up the connection between OBD-II connector 24 and roll test computer system 18, and starts the test cycle. Roll test computer system 18 then transfers the vehicle parameters to vibration analyzer 16 and lowers accelerometer 20 onto vehicle 12 while vibration analyzer 16 begins collecting data. During the course of a roll test, vehicle 12 is operated over a full range of speeds in a controlled sequence. Vibration analyzer 16 compares vibration readings during the roll test to one or more preset thresholds. If vibrations during the roll test did not exceed one of these thresholds, then vibration analyzer 16 would generate a pass signal for roll test computer system 18. If vibration during the roll test exceeded one of these thresholds, then vibration analyzer 16 would generate a fail signal for roll test computer system 18 to generate a cause report. The cause report includes magnitude of the vibration in question, what engine rpm it occurred at, vehicle parameters, and likely cause. Vibration analyzer 16 then transfers the cause report to a networked computer for future reference. At the conclusion of the test cycle, the operator removes the hook up to OBD-II connector 24, and roll test computer system 18 removes accelerometer 20.

The sequence then proceeds to step 34. To repair a vehicle, a repair person would access the cause report from the networked computer. The information for a given vehicle would be identified by a vehicle identification number (VIN). The repair person then makes repairs as determined by vibration analyzer 16. In the repair station, accelerometer 20 is manually placed on vehicle 12 by the repair person, and vibration analyzer 16 is connected to OBD-II connector 24 to obtain engine rpm data. Repairs are verified with repair vibration analyzer 16, either in the repair station or by road testing if required. Repaired vehicle data and confirmation by vehicle analyzer 16 that vehicle 12 has been repaired is then stored on the networked computer for access by a NVH engineer.

In another aspect of the invention, the sequence begins with step 36. The method of incorporating customer feedback into correcting vehicle vibration begins by interviewing a vehicle owner concerning an objectionable vehicle vibration. The dealer then connects a vibration analyzer to the vehicle with the objectionable vibration through an OBD-II connector. This allows the vibration analyzer to monitor engine rpm, engine type, vehicle speed, vehicle type, and tire size. The dealer then drives the vehicle at a full range of speeds in a controlled sequence with the vehicle owner to reproduce the objectionable vehicle vibration.

The sequence then proceeds to step 38. While the vehicle is driven, the vibration analyzer detects any vehicle vibration generated. The vibration analyzer then compares the vehicle vibration in conjunction with engine rpm, engine type, vehicle speed, vehicle type, and tire size when the vehicle owner identifies the objectionable vibration. The vibration analyzer then determines a probably cause for the vehicle vibration and generates a cause report. The dealer uses the cause report to correct the objectionable vehicle vibration.

The sequence then proceeds to step 40. After repairing the vehicle, the dealer verifies with the vehicle owner that the vehicle vibration is gone. The cause report is then sent to a NVH engineer where it is analyzed to provide feedback to the vibration analyzer and design engineers for possible future use concerning other vehicles.

The method and system of the present invention reduce the labor required to objectively detect vehicle vibration. The present invention, also, provides immediate feedback to repair personnel so that the vehicle vibration may be corrected. Additionally, because a NVH engineer receives all vibration cause reports, long term design actions may taken to permanently correct any recurring vibration problems.

From the foregoing, it can be seen that there has been brought to the art a new and improved method to incorporate customer feedback into correcting vehicle vibration. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method of incorporating customer feedback into correcting vehicle vibration comprising the steps of:

coupling a vehicle to a vibration analyzer, said vibration analyzer has access to vehicle data;

driving said vehicle with a vehicle owner;

detecting said vehicle vibration generated while said vehicle is operating, wherein said vehicle vibration is objectionable to said vehicle owner;

determining a cause of said vehicle vibration as a function of said vehicle data;

repairing said vehicle to correct said vehicle vibration based upon said cause; and verifying that said vehicle vibration has been repaired with said vehicle owner.

2. The method of incorporating customer feedback into correcting vehicle vibration as recited in claim 1, wherein the step of coupling comprises:

connecting said vibration analyzer to a vehicle OBD-II connector, through which vibration analyzer has access to engine rpm, engine type, vehicle speed, vehicle type, and tire size; and coupling an accelerometer to said vehicle, said accelerometer generates a vibration signal and is coupled to said vibration analyzer.

3. The method of incorporating customer feedback into correcting vehicle vibration as recited in claim 2, wherein the step of determining a cause comprises determining at least one cause of said vehicle vibration as a function of said engine rpm, engine type, vehicle speed, vehicle type, tire size and said vibration signal where said vehicle vibration is objectionable to said vehicle owner.

4. The method of incorporating customer feedback into correcting vehicle vibration as recited in claim 3, further comprising the step of generating a cause report, wherein said cause report includes said engine rpm, engine type, vehicle speed, vehicle type, tire size and said vibration signal where said vehicle vibration is objectionable to said vehicle owner.

5. The method of incorporating customer feedback into correcting vehicle vibration as recited in claim 1, wherein the step of driving comprises operating said vehicle at a full range of speeds in a controlled sequence.

6. The method of incorporating customer feedback into correcting vehicle vibration as recited in claim 1, further comprising the step of interviewing said vehicle owner regarding said vehicle vibration.

7. The method of incorporating customer feedback into correcting vehicle vibration as recited in claim 1, further comprising the step of generating a cause report as a function of said cause, said cause report includes vehicle owner comments, said vehicle data, and said cause.

8. The method of incorporating customer feedback into correcting vehicle vibration as recited in claim 7, further comprising the step of storing said cause report on a networked computer.

9. The method of incorporating customer feedback into correcting vehicle vibration as recited n claim 8, further comprising the step of reading aid cause report from said networked computer.

10. The method of incorporating customer feedback into correcting vehicle vibration as recited in claim 9, wherein said networked computer is coupled to an Intranet.

11. The method of incorporating customer feedback into correcting vehicle vibration as recited in claim 9, wherein said networked computer is coupled to an Internet.

12. The method of incorporating customer feedback into correcting vehicle vibration as recited in claim 1, further comprising the step of analyzing said cause report to provide feedback to said vibration analyzer and design engineers.

13. The method of incorporating customer feedback into correcting vehicle vibration as recited in claim 1, further comprising the step of coupling said vehicle to a repair vibration analyzer to verify that said vehicle vibration has been repaired.

14. The method of incorporating customer feedback into correcting vehicle vibration as recited in claim 1 further comprising the step of decoupling said vehicle from said vibration analyzer.

15. The method of incorporating customer feedback into correcting vehicle vibration as recited in claim 12, wherein the step of decoupling comprises:

disconnecting said vibration analyzer from a vehicle OBD-II connector; and decoupling an accelerometer from said vehicle.

16. The method of incorporating customer feedback into correcting vehicle vibration as recited in claim 1, further comprising the step of storing a confirmation of repair on a networked computer.

17. The method of incorporating customer feedback into correcting vehicle vibration as recited in claim 1, further comprising the step of transferring said cause to a NVH engineer.

18. A method of incorporating customer feedback into correcting vehicle vibration comprising the steps of:

interviewing a vehicle owner regarding said vehicle vibration;

connecting a vibration analyzer to a vehicle OBD-II connector, through which said vibration analyzer has access to engine rpm, engine type, vehicle speed, vehicle type, and tire size;

coupling an accelerometer to said vehicle, said accelerometer generates a vibration signal;

driving said vehicle at a full range of speeds in a controlled sequence with said vehicle owner to reproduce said vehicle vibration;

detecting said vehicle vibration generated while said vehicle is operating as a function of said vibration signal;

relating said vehicle vibration in conjunction with said engine rpm, engine type, vehicle speed, vehicle type, and tire size to vehicle vibration objectionable to said vehicle owner;

determining a cause of said vehicle vibration as a function of said engine rpm, engine type, vehicle speed, vehicle type, and tire size where said vehicle vibration is objectionable to said vehicle owner;

generating a cause report, wherein said cause report includes vehicle owner comments, said engine rpm, engine type, vehicle speed, vehicle type, tire size and said vibration signal where said vehicle vibration is objectionable to said vehicle owner;

storing said cause report on a networked computer;

reading said cause report from said networked computer;

repairing said vehicle to correct said vehicle vibration based upon said cause report;

verifying that said vehicle vibration has been repaired with said vehicle owner;

storing a confirmation of repair on said networked computer; and transferring said cause report to a NVH engineer; and analyzing said cause report to provide feedback to said vibration analyzer and design engineers.

* * * * *